United States Patent [19]

Girguis

[11] Patent Number: 4,467,902
[45] Date of Patent: Aug. 28, 1984

[54] OVERLOAD CLUTCH

[76] Inventor: Sobhy L. Girguis, Magdalenenstr. 19, 5210 Troisdorf-Oberlahr, Fed. Rep. of Germany

[21] Appl. No.: 241,736

[22] Filed: Mar. 9, 1981

[30] Foreign Application Priority Data

Mar. 11, 1980 [DE] Fed. Rep. of Germany ....... 3009244

[51] Int. Cl.³ .......................... F16D 7/06; F16D 43/20
[52] U.S. Cl. .................................... 192/56 R; 464/36; 464/38
[58] Field of Search ................. 192/56 R; 464/35, 36, 464/37, 38, 41

[56] References Cited

U.S. PATENT DOCUMENTS

| 2,969,132 | 1/1961 | Stewart | 464/36 X |
| 3,095,955 | 7/1963 | Orwin | 192/56 R |
| 3,185,275 | 5/1965 | Orwin | 192/56 R |
| 3,252,303 | 5/1966 | Weasler et al. | 464/36 |
| 3,270,844 | 9/1966 | Orwin | 192/56 R |
| 3,292,754 | 12/1966 | Peterson | 192/56 R |
| 3,319,753 | 5/1967 | Orwin et al. | 192/56 R |
| 4,263,996 | 4/1981 | Putney | 192/56 R |

FOREIGN PATENT DOCUMENTS

| 556984 | 8/1932 | Fed. Rep. of Germany . |
| 1761856 | 2/1958 | Fed. Rep. of Germany . |
| 1101059 | 3/1961 | Fed. Rep. of Germany . |
| 2517910 | 11/1976 | Fed. Rep. of Germany . |
| 2540489 | 12/1976 | Fed. Rep. of Germany . |
| 2729545 | 1/1979 | Fed. Rep. of Germany . |
| 39404 | 9/1965 | German Democratic Rep. . |
| 809101 | 2/1959 | United Kingdom . |
| 818024 | 8/1959 | United Kingdom . |

Primary Examiner—Rodney H. Bonck
Attorney, Agent, or Firm—Karl F. Ross

[57] ABSTRACT

Two coaxial clutch members, one driving and one driven, are normally coupled for joint rotation by several peripherally spaced rotary coupling elements projecting under a resilient biasing force into aligned sets of recesses thereof, at least one of these sets having camming edges by which the coupling elements are dislodged against their biasing force when the driven clutch member tends to lag behind the driving clutch member in the event of an overload. One clutch member, or a guide member entrained thereby, has peripherally spaced-apart lodgments which are aligned with its recesses at least during normal operation and confine the cammed-out coupling elements under overload conditions; the guide member may be a cage operatively connected with both clutch members through a planetary-gear transmission so as to rotate about their axis at a speed intermediate those of the two clutch members when they are decoupled from each other.

17 Claims, 10 Drawing Figures

OVERLOAD CLUTCH

FIELD OF THE INVENTION

My present invention relates to an overload clutch of the type wherein two coaxial clutch members, one of them driving and the other driven, are normally linked for joint rotation by a plurality of coupling elements such as balls arrayed about their axis.

BACKGROUND OF THE INVENTION

Clutches of this type, with spherical coupling elements biased by one or more springs into positive engagement with respective pairs of aligned part-spherical recesses of the two clutch members, are known for example from German printed Specification (Auslegeschrift) No. 1,101,059. In the event of an overload, i.e. when the resistance of the driven member exceeds the torque that can be safely transmitted by the driving member, these coupling elements are cammed out of their recesses against the biasing spring force and enter an endless track offset from those recesses. The width of the track may be greater than that of the recesses to minimize the resistance against relative rotation of the decoupled clutch members.

The re-engagement of the decoupled members of such a clutch requires a deactivation of the driving member and a realignment of their recesses with each other and with the spherical coupling bodies. Overload clutches are also known in which such realignment and re-engagement can be carried out automatically. Generally, however, these clutches are rather noisy when decoupled, owing to a ratchet effect which also subjects their parts to severe impacts and corresponding wear. In order to avoid this drawback, it has already been proposed (see East German Pat. No. 39, 404) to deactivate the clutch upon its disengagement by the opening of electrical contacts; this, of course, is possible only with electric drives.

OBJECT OF THE INVENTION

The object of my present invention, therefore, is to provide an improved clutch of the type referred to, e.g. for use with agricultural vehicles or machinery, which obviates all the aforestated disadvantages.

SUMMARY OF THE INVENTION

In an overload clutch according to my invention, whose driving and driven members are provided with respective sets of peripherally spaced recesses which are mutually aligned in a normal relative position thereof to accommodate resiliently biased coupling elements, the recesses of at least one of these members have camming edges for dislodging the coupling elements therefrom against the biasing force upon the occurrence of an overload while guide means operatively connected with the other clutch member form peripherally spaced-apart lodgments which normally communicate with respective pairs of aligned recesses and which intercept the dislodged coupling elements and confine them in predetermined relative positions upon the decoupling of the two clutch members from each other.

The lodgment-forming guide means may comprise formations integral with the associated clutch member constituting permanent extensions of the recesses of that member. Alternatively, the guide means may comprise a cage centered on the axis of rotation and connected with both clutch members by differential gear means imparting to that cage a rotary speed which lies between the speeds of the clutch members in their decoupled condition. Such a cage may be disposed in an annular gap between the clutch members and may have axles supporting a plurality of planet gears included in the differential gear means. In the case of a generally cylindrical rather than planar gap, i.e. when one clutch member concentrically surrounds the other, the coupling elements may be spherical bodies biased into their recesses by two concentric pressure rings with spherically concave surfaces bearing upon these bodies inside and outside the gap, respectively, preferably under the action of a spring-loaded ring which is axially juxtaposed with the two pressure rings and is separated therefrom by respective antifriction bearings to minimize all-around wear. In some instances, as more fully described hereinafter, each coupling element may be split into two coaxial bodies disposed on opposite sides of the gap with freedom of relative rotation.

BRIEF DESCRIPTION OF THE DRAWING

The above and other features of my present invention will now be described in detail with reference to the accompanying drawing in which.

SPECIFIC DESCRIPTION

Figure 1:
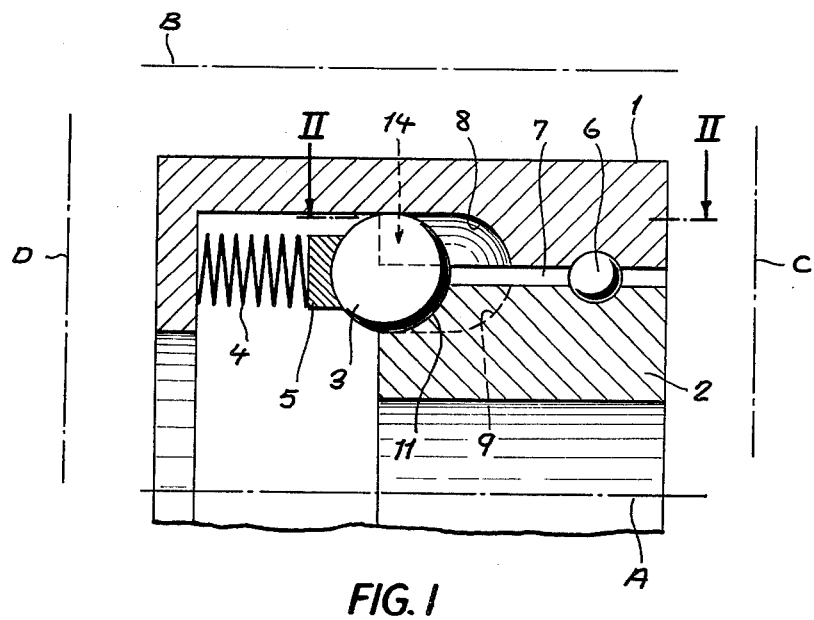
FIG. 1 is a diagrammatic cross-sectional view of an overload clutch embodying my invention.

FIG. 1 shows, somewhat schematically, an overload clutch according to my invention with two concentric members 1 and 2 rotatable about an axis A. These clutch members, one of which is driven by a nonillustrated prime mover, are normally interconnected by spherical coupling elements 3 which are peripherally arrayed about axis A and are partly received in respective recesses 8 and 9 which together form a number of roughly hemispherical pockets with a radius of curvature only slightly larger than that of sphere 3. Each of these spherical bodies is biased into the corresponding pair of recesses by a compression spring 4 acting upon a shoe 5 which is guided in member 1 by means not further illustrated; the end of spring 4 bears upon an extension of that clutch member. A cylindrical gap 7 centered on axis A separates the two members 1 and 2 from each other, with interposition of bearing balls 6.

Figure 2:
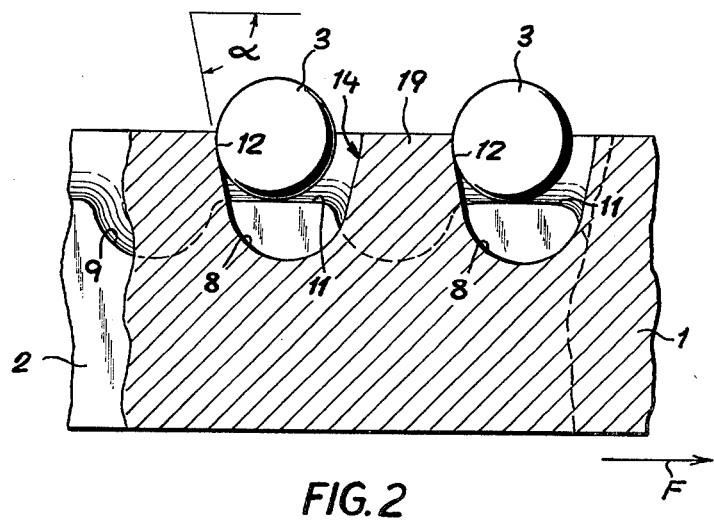
FIG. 2 is a developed fragmentary sectional view taken on the line II—II of FIG. 1.

If, for example, clutch member 1 is directly connected with the prime mover and clutch member 2 is mounted on an output shaft driving a load, the exertion of an exceptionally large braking torque upon that shaft and thus upon member 2 will cause coupling element 3 to be cammed out of recesses 8 and 9 whose shape is shown in FIG. 2. Body 3 will then occupy the position shown in FIG. 1 in which it comes to rest against arcuate shoulders 11 separating adjacent recesses 9 of member 2. During the ensuing relative rotation of the members, recesses 8 and 9 will be intermittently realigned for brief periods but not long enough to let the bodies 3 re-enter them. A certain clicking will occur, however, which may not be unwelcome since it will apprise the operator of the deactivation of the clutch, in some instances, e.g. with agricultural equipment, the resulting vibrations may even be helpful in shaking off matter giving rise to the overload, as by clogging the transmission.

In FIG. 1 I have also indicated other possible axes of rotation B, C and D. With axis B at the center, member 1 would become the inner and member 2 the outer part of the clutch. With rotation about axis C or D, these members as well as the intervening gap 7 would be planar instead of cylindrical, yet the mode of operation would be essentially that described above.

With the particular construction illustrated in FIGS. 1 and 2, the spheres 3 cammed out of recesses 8 and 9 are peripherally confined by lodgments 14 of member 1 which are separated by guide ridges 19 and form peripherally widening extensions of recesses 8, the flanks 12 of these lodgments including a relatively steep angle with the plane of rotation while merging tangentially into the generatrices of the recesses. With driving member 1 assumed to rotate in the direction indicated by an arrow F, the spheres 3 will rest against the left-hand flanks of their symmetrical lodgments as viewed in FIG. 2.

When the rotation of clutch member 1 is sufficiently slowed down, the springs 4 (not illustrated in FIG. 2) will force the coupling elements 3 back into the respective recesses 8 as soon as they register with corresponding recesses 9 of member 2. Thus, the clutch can be re-engaged by a suitable deceleration.

If the peripheral spacing or pitch of recesses 8 and 9 is made nonuniform, the number of alignment positions and thus the number of clicks occurring during one relative revolution will be reduced. These recesses may, for example, be distributed around the peripheries of their respective members at locations 80°, 100°, 80° and again 100° apart to minimize the ratchet noise in the decoupled state.

Figure 3:
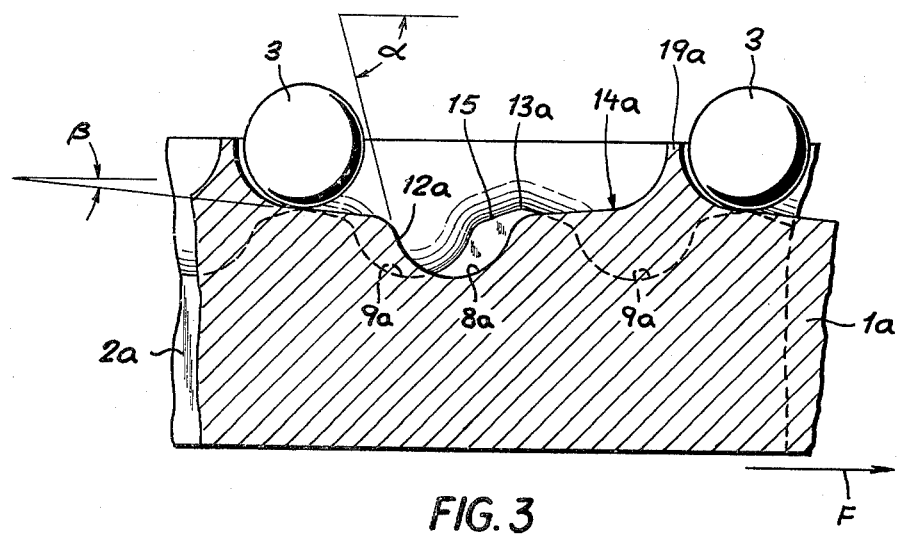
FIGS. 3 and 4 are views similar to FIG. 2, illustrating respective modifications.

In FIG. 3 I have shown two modified clutch members 1a and 2a differing from the corresponding clutch members of FIG. 2 only in the configuration of their recesses and lodgments. Thus, the recesses 8a of member 1a are extended by lodgments 14a whose flanks 12a are no longer tangential to their generatrices but are inclined with reference to the end faces of the clutch members, and therefore to the plane of rotation, at an angle β which is much smaller than the tangential angle α. The lodgments 14a formed between ridges 19a are much wider than lodgments 14 of FIG. 2 and each of them, in contrast to the preceding embodiment, spans two adjoining recesses 9a of member 2a. The latter recesses, in turn, are separated by camming formations with flanks 15 which are substantially parallel to flanks 12a of lodgments 14a and culminate in rounded peaks 13a projecting slightly beyond flanks 12a in the position of alignment of recesses 8a and 9a. As long as angle β is sufficiently greater than zero, this configuration of clutch member 2a will help re-engage the spring-loaded bodies 3 with recesses 8a and 9a when the relative rotation of members 1a and 2a is reversed. In the decoupled state, on the other hand, there will be virtually no clicking as bodies 3 abut the ridges 19a in positions beyond the orbit of peaks 13a.

Figure 4:
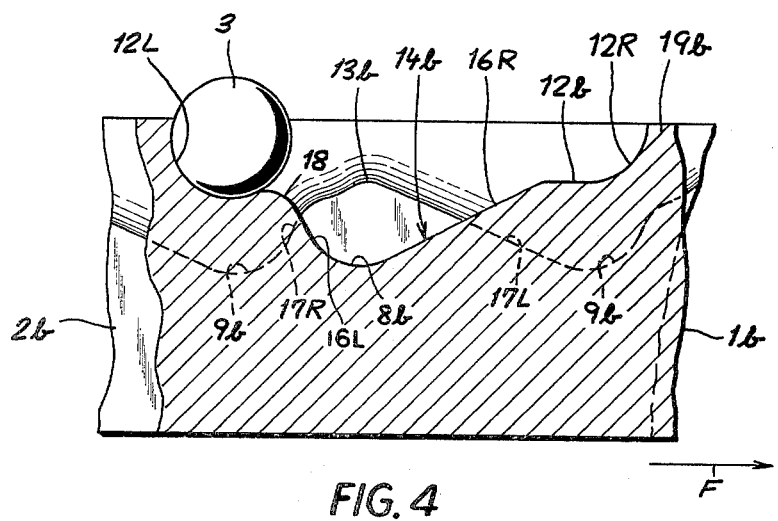

In FIG. 4 I have shown another modification in which members 1b and 2b have recesses 8b and 9b of identical pitch, but with unsymmentrical flanks, contrary to the preceding embodiments. The left-hand flank 16L of each recess 8b is much steeper than its right-hand flank 16R and is separated from a lateral pocket 12L of lodgment 14b, next to a ridge 19b, by a hump 18 which projects slightly less than peaks 13b of member 2b in the axial direction. Right-hand flanks 17R of recesses 9b are steeper than their left-hand flanks 17L. Lodgments 14b also have right-hand lateral pockets 12R which, however, are separated from their flanks 16R by lands 12b with an angle of inclination close to zero. Owing to the difference in flank slope, an escapement of spheres 3 from their recesses will require a larger resistance torque during forward rotation (arrow F) than during reverse motion.

The greater peripheral mobility of the spheres in the lodgments 14a and 14b will require a replacement of the simple coil springs 4 (FIG. 1) by different biasing means such as, for example, Belleville springs similar to those shown in subsequent Figures.

In the event of an overload during forward driving, coupling elements 3 will lodge in pockets 12L as illustrated. They will be slightly jolted by the passing peaks 13b but will not return to their engagement position until the relative rotation of members 1b and 2b is reversed. If after re-engagement and with continuing reverse rotation another obstacle is encountered, coupling elements 3 will again be cammed out of recesses 8b and 9b so as to become lodged in the right-hand pockets 12R just beyond the reach of peaks 13b. In this overload condition, therefore, the clutch members remain decoupled until the bodies 3 are manually removed from their pockets.

Figure 5:
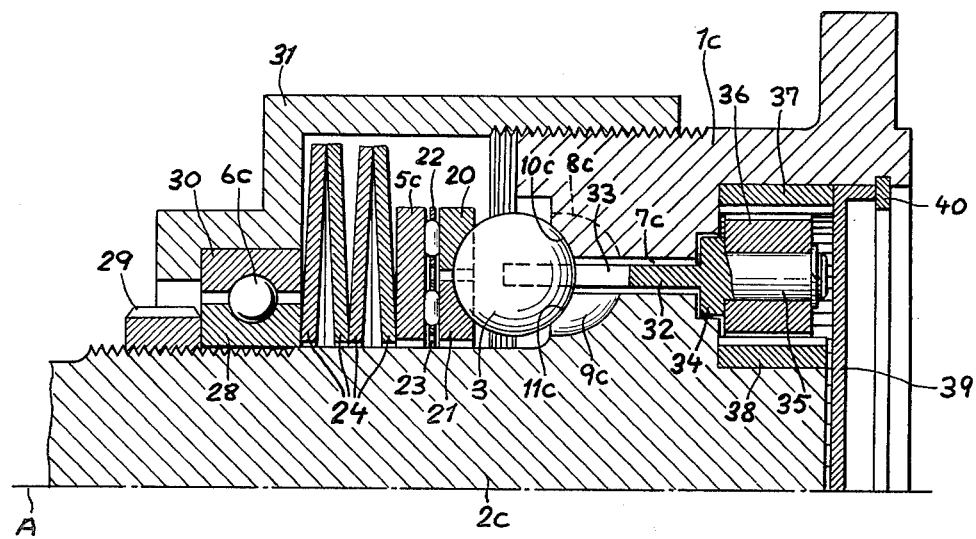
FIG. 5 is an axial sectional view of an overload clutch according to my invention with concentric members separated by a cylindrical gap.

In FIG. 5 I have shown details of a clutch according to my invention with cylindrical members 1c and 2c separated by an annular gap 7c. The outer member 1c is threadedly engaged by a cap 31 surrounding an outer race 30 of a ball bearing 6c whose inner race 28 is held in position on member 2c by a nut 29. An annular clearance formed between cap 31 and clutch members 1c, 2c accommodates a stack of Belleville springs 24 abutting a flat ring 5c which is separated by two roller bearings with concentric cages 22, 23 from a pair of concentric pressure rings 20 and 21. The concave surfaces of these pressure rings are in contact with respective halves of a set of spherical coupling elements 3 (only one shown) which, like their counterparts in the preceding Figures, fit into aligned complementary recesses 8c and 9c of the two clutch members. Upon being cammed out of these recesses into the illustrated disengagement position, against the pressure of Belleville springs 24, spheres 3 come to rest against arcuate shoulders 10c and 11c similar to shoulders 11 of FIG. 1. This pressure can be adjusted by rotation of nut 29 and/or cap 31; a rightward displacement of only one of these elements will transfer virtually the entire pressure to one or the other clutch member.

In contradistinction to the preceding embodiments, the spheres 3 of FIG. 5 are not peripherally confined by guide means such as ridges 19, 19a, 19b rigid with one of the clutch members. Instead, a cylindrical cage 32 rotatably disposed in gap 7c has cutouts 33 of a depth approximately equal to the diameter of the spheres in which the latter are received in both their engaged and their disengaged positions. Cage 32 has a peripheral flange 34 provided with a set of angularly spaced-apart pins 35 on which respective planet gears 36 (only one shown) are rotatably journaled. These planet gears form part of a differential-gear transmission further including a ring gear 37 rigid with clutch member 1c and a sun gear 38 rigid with clutch member 2c. Planet gears 36 are shielded against the outside by a closure cap 39 held in place by a split ring 40.

As long as driven member 2c is positively entrained by driving member 1c through the intermediary of coupling elements 3, cage 32 rotates about axis A at the same speed. If, however, an overload forces these coupling elements out of the recesses 8c and 9c, they roll along mirror-symmetrical shoulders 10c and 11c of the two clutch members at the speed of cage 32 which is intermediate those of members 1c and 2c. Realignment occurs only in certain relative positions of the two clutch members and the cage, determined by the diameters of gears 37 and 38; the frequency of the clicks resulting from a temporary coincidence of cutouts 33 and recesses 8c, 9c can thus be selected within wide limits.

Figure 6:
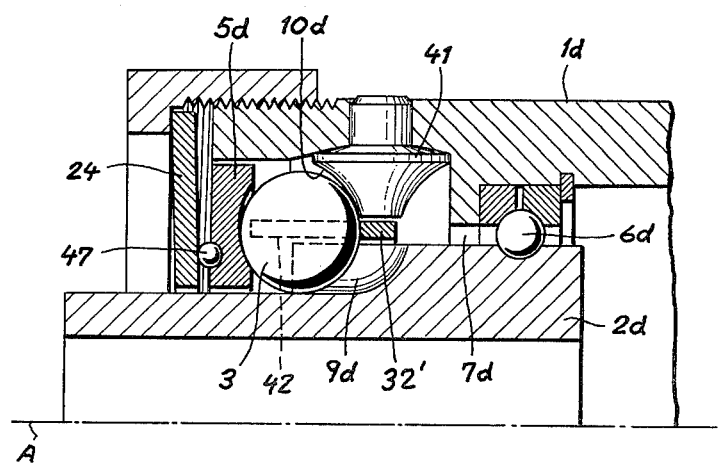
FIGS. 6, 7 and 8 are views similar to FIG. 5, showing further modifications.

FIG. 6 shows an embodiment with cylindrically coaxial clutch members 1d and 2d separated by an annular gap 7d and a ball bearing 6d. Member 1d carries a peripheral array of rollers 41 (only one shown) of generally frustoconical shape whose concave generatrices have radii only slightly larger than that of spherical coupling elements 3. These coupling elements are under pressure of a Belleville spring 24 acting through bearing balls 47 upon a ring 5d with a concave annular contact surface whose radius of curvature also exceeds but slightly that of spheres 3. The separation of rollers 41 from one another substantially equals the peripheral width of recesses 9d in clutch member 2d whereby, upon proper alignment of the two clutch members, coupling elements 3 are thrust by the spring 24 into the spaces between adjacent rollers for positive engagement therewith. When these elements are cammed out of that engagement position by the rollers 41 in the event of an overload, they are still peripherally confined by extensions of recesses 9d while rolling along a track defined by generatrices 10d of these rollers. Despite the positive guidance of spheres 3 by the extended flanks of recesses 9d I prefer for greater operational reliability to provide a freely rotatable annular cage 32' with cutouts 42 embracing these spheres over more than half of their periphery.

The use of camming rollers 41 allows the clutch members 1d and 2d as well as the pressure ring 5d to be manufactured from less expensive material since only the rollers need to be manufactured from highly wear-resistant metal. The roller shafts may be supported in member 1d by antifriction bearings not shown.

Figure 7:
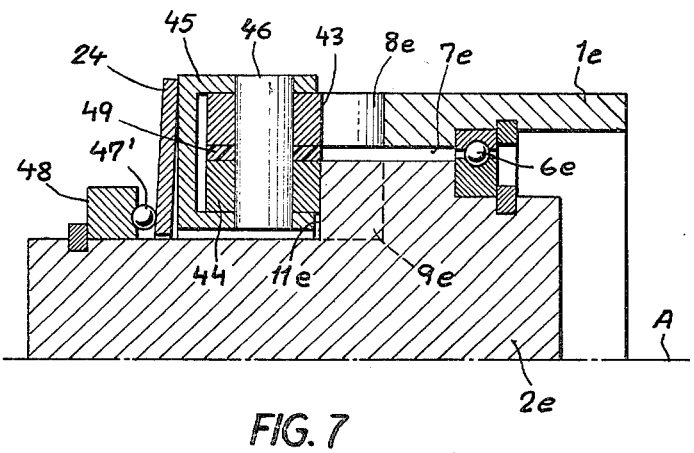

The clutch of FIG. 7 has outer and inner members 1e, 2e separated by a ball bearing 6e and an annular gap 7e, these members being provided with respective recesses 8e and 9e differing from those of the preceding Figures by being semicylindrical instead of part-spherical. The coupling elements of this clutch, likewise, are not spherical but consist each of two coaxial rollers 43, 44 separated by an antifriction disk 49 in line with gap 7e. The two rollers 43, 44 of each coupling element are journaled (with interposition of ball or needle bearings, if desired) on an axle 46 which is mounted in flanges of an annular cage 45 of U-shaped cross-section; a Belleville spring 24 presses upon cage 45 and is separated by bearing balls 47' from an abutment ring 48 on member 2e so as to be freely rotatable with cage 45 and coupling elements 43, 44 at the speed of member 1e in the illustrated position of disengagement. With body 43 still confined in an extension of recess 8e under these conditions, body 44 rolls on shoulders 11e of member 2e under pressure of spring 24. Body 44 and shoulders 11e could be provided with interfitting gear teeth for low-friction contact. Since body 43 executes essentially a sliding motion with little if any rotation, it may have a shape different from that of body 44 and in fact need not be a roller at all.

Figure 8:
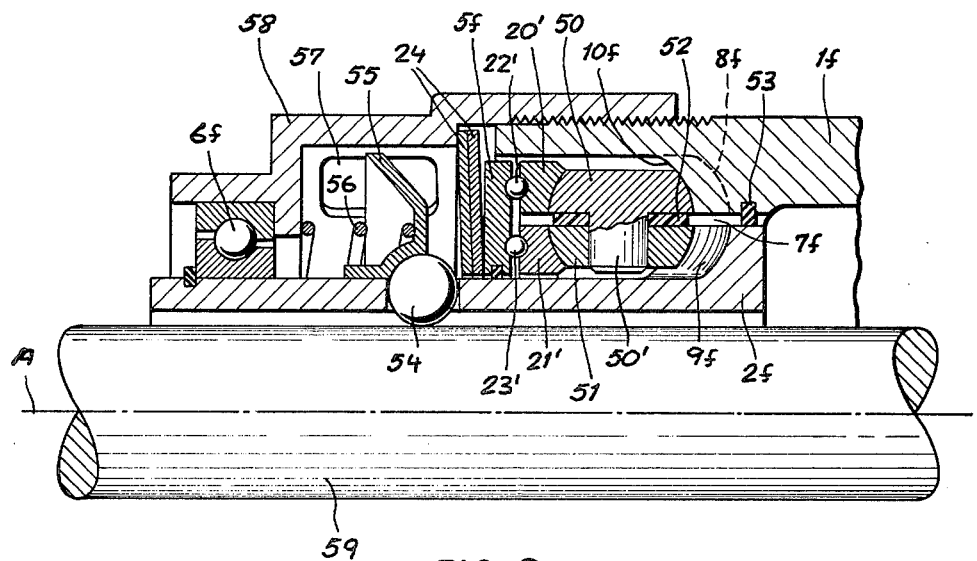

The clutch shown in FIG. 8 comprises again two concentric cylindrical members 1f and 2f separated by a cylindrical gap 7f which is here closed by a low-friction sealing ring 53. The coupling elements used in this instance are similar to those of FIG. 7, each comprising two relatively rotatable coaxial rollers 50 and 51 carried on a cylindrical cage 52 of antifriction material; each roller 51 is journaled on a stem 50', integral with roller 50, traversing a circular cutout of that cage. A cap 58 threaded onto member 1f forms a shoulder which serves as an abutment for a pair of Belleville springs 24 acting upon an assembly of rings 5f, 20', 21' similar to rings 5c, 20 and 21 of FIG. 5; pressure rings 20' and 21', separated by ball bearings 22' and 23' from spring-loaded ring 5f, have concave surfaces in contact with rollers 50 and 51, respectively. Contrary to the unitary spherical coupling elements 3 of FIG. 5, these rollers retain their orientation about an axis transverse to the axis of rotation A.

Cap 58 is carried on clutch member 2f by a ball bearing 6f. The entire clutch assembly is mounted on a shaft 59 on which its inner member 2f can be immobilized with the aid of a quick-acting locking mechanism comprising balls 54 in circular apertures of member 2f and a camming ring 55 slidable on that member under pressure of a coil spring 56. Cap 58, which encloses this locking mechanism, has windows 57 enabling a manual retraction of ring 55 against the force of spring 56 to release the clutch from shaft 59. Recesses 8f and 9f of members 1f and 2f are generally similar to recesses 8 and 9 of FIGS. 1 and 2, except that in this case the recesses 9f of inner member 2f are extended to form lodgments retaining the coupling elements 50, 51 after they have been cammed out of recesses 8f of outer member 1f so as to come to rest against shoulders 10f thereof. Unlike cage 45 of the preceding embodiment, cage 52 is not subjected to the biasing force of springs 24.

Figure 9:
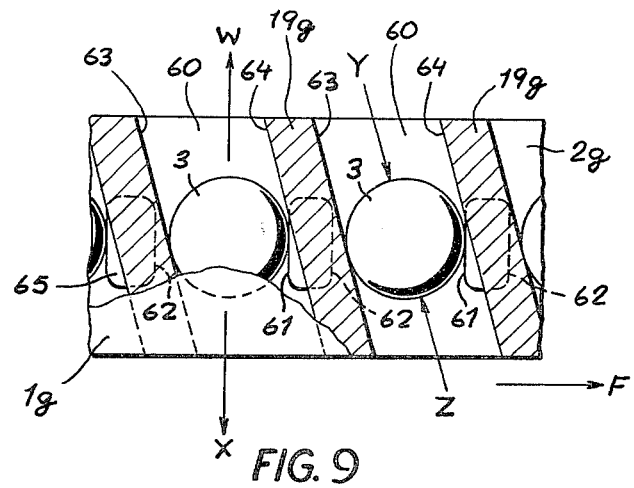
FIG. 9 is a developed fragmentary sectional view of a bidirectionally effective overload clutch according to my invention.

In FIG. 9 I have diagrammatically shown part of two coacting clutch members 1g and 2g, member 1g being formed with a plurality of peripheral grooves 60 which are centered on helicoidal lines and are of constant width only slightly exceeding the diameter of spherical coupling elements 3; the grooves are bounded and separated from one another by helicoidal ridges 19g of lesser width. In the illustrated alignment position of members 1g and 2g, the middle zones of these grooves—which may be considered recesses functionally equivalent to those shown at 8 etc. in the preceding Figures—overlie coacting recesses formed between bosses 65 integrally rising from clutch member 2g, the latter recesses being open in both axial directions W and X of the clutch. With driving member 1g again assumed to rotate in the direction of arrow F, the spheres 3 are gripped between the left-hand edges 63 of grooves 60 and confronting edges 61 of bosses 65, thereby positively entraining the driven member 2g. Biasing springs (not shown), exerting opposite forces Y and Z upon these spheres, tend to keep them in that engaged position.

Figure 10:
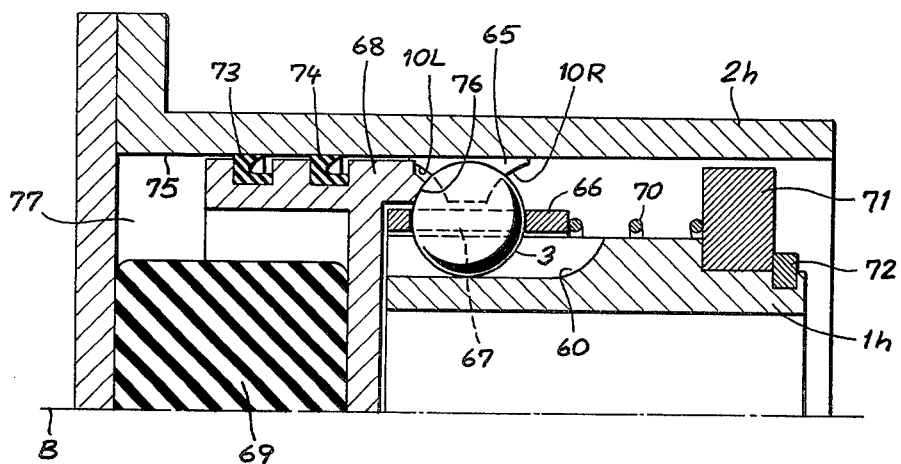
FIG. 10 is an axial sectional view of a clutch embodying the principles of the structure shown in FIG. 9.

The depth of grooves 60 and the height of bosses 65 (whose relative radial position will be apparent from FIG. 10 described hereinafter) is between one quarter and one half of the diameter of spheres 3; the intervening gap may be occupied by a cage, as shown at 66 in FIG. 10, holding the spheres in mutual alignment.

When the driven member 2g is arrested by an external obstacle, the continued rotation of driving member 1g causes its edges 63 to cam the spheres 3 out of the recesses of member 2g against spring force Y until the spheres clear the bosses 60 while still remaining confined between ridges 19g of member 1g. After a sufficient reduction in the relative speed of the two clutch members, this spring force will restore the illustrated engagement position upon alignment of bosses 65 with ridges 19g.

When the driving member 1g rotates in the reverse direction (or when member 2g drives in the direction of arrow F), coupling elements 3 will be gripped between edges 64 of grooves 60 and confronting edges 62 of bosses 65. In the event of an overload, elements 3 will be cammed in the opposite sense (against spring force Z) in a manner analogous to that described above. It will be apparent, however, that the shape of the grooves and especially the slope of their ridges 19g in respective halves thereof may be modified so that different resistance torques will be required for decoupling in the two directions of rotation. Similar results can be achieved by the use of springs of different stiffness effective in directions W and X so that an excursion in one axial direction encounters but little resistance, so little in an extreme case that the two decoupled clutch members are virtually free-wheeling without clicking or ratchet effect under overload conditions.

It may also be mentioned that ridges 19g could be made triangular or trapezoidal so as to point alternately in opposite directions, with opposite inclination of adjoining grooves 60; in such a case, in which no cage could be used, alternate spheres 3 would be cammed in opposite directions in the event of an overload for a more uniform stressing of the clutch assembly.

In FIG. 10 I have illustrated a physical realization of an overload clutch using the principles discussed with reference to FIG. 9. Spheres 3 are confined here in helocoidal grooves 60 of an inner clutch member 1h while an outer clutch member 2h has peripherally spaced bosses 65 flanking these spheres in the engagement position shown. Instead of fixed bosses 65 I may also use rollers similar to those shown at 41 in FIG. 6. A cylindrical cage 66, already referred to above, has circular cutouts 67 receiving the spheres 3 and is biased leftward by a coil spring 70 also bearing upon an abutment ring 71 held in position on member 1h by a snap ring 72. A countervailing biasing force is exerted upon spheres 3 by a piston 68 which is axially slidable in clutch member 2h under pressure of a resilient pad 69 of rubber or the like; piston 68 is provided with annular gaskets 73, 74, bearing upon the inner cylinder wall of member 2h, and has an annular shoulder 76 with a concave surface contacting the spheres 3 and pressing them against the opposite edges of cage apertures 67.

When an overload occurs, spheres 3 will be cammed out of their engagement position in one direction or the other depending on the sense of rotation and on the slope of grooves 60. If the dislodgment is toward the left as viewed in FIG. 10, piston 68 and pad 69 will give way whereupon spheres 3 will roll along shoulders 10L of bosses 65. In the latter instance, air confined in a space 77 surrounding the pad 69 will also be compressed and will partly escape gaskets 73 and 74 with the result that a return of the piston to its illustrated normal position, after deceleration or arrest of the driving member and realignment of bosses 65 with the ridges separating grooves 60, will be subjected to a certain hysteresis or damping effect. A similar damping effect, due to generation of a partial vacuum in space 77, will come into play upon a dislodgment of the spheres 3 to the right, causing them to roll along shoulders 10R of bosses 65. Here, again, different resistance torques may release the clutch with opposite directions of rotation.

Since cylinder 1h represents the inner clutch member, the axis of rotation in FIG. 10 has been designated B in conformity with the diagrammatic showing of FIG. 1. In FIGS. 2–4 and 9 the axis is assumed to be vertical, yet the structures shown there can be readily modified—by a curving of their horizontal boundaries—to apply to a pancake-type clutch with planar members rotating about an axis perpendicular to the plane of the drawing, as indicated at C and D in FIG. 1. The structures of FIGS. 5–8 and 10 could also be modified to make the clutch members and the intervening gap frustoconical rather than cylindrical as shown.

I claim:

1. An overload clutch comprising:
    a driving clutch member and a driven clutch member rotatable about a common axis and separated from each other by an annular gap of invariable radial width centered on said axis, said clutch members being provided with respective sets of peripherally spaced recesses which are mutually aligned across said gap in a normal relative position thereof;
    a plurality of coupling elements arrayed about said axis, said coupling elements being partly receivable in pairs of aligned recesses of the two sets;
    biasing means effective in the direction of said axis for resiliently urging said coupling elements into positive engagement with respective pairs of aligned recesses during joint rotation of said clutch members, the recesses of at least one of said clutch members having camming edges for axially dislodging said coupling elements therefrom against the force of said biasing means upon the occurrence of an overload whereby said driven clutch member is decoupled from said driving clutch member; and
    guide means operatively connected with the other of said clutch members, said guide means forming peripherally spaced-apart lodgments which communicate with said pairs of recesses in said normal relative position for intercepting the dislodged coupling elements and confining same in predetermined relative positions upon decoupling of said members from each other.

2. An overload clutch as defined in claim 1 wherein said guide means comprises formations integral with said other of said clutch members, said lodgments constituting permanent extensions of associated recesses of said other of said clutch members.

3. An overload clutch as defined in claim 2 wherein said lodgments are peripherally wider than said associated recesses.

4. An overload clutch as defined in claim 3 wherein said lodgments form pockets offset from said associated recesses on both sides of the latter for receiving the dislodged coupling elements therein.

5. An overload clutch as defined in claim 4 wherein said pockets on at least one side of said associated recesses have sloping flanks enabling an automatic return of the dislodged coupling elements to pairs of realigned recesses of the two sets upon a reversal of the relative speed of the decoupled clutch members.

6. An overload clutch as defined in claim 4 wherein said pockets on at least one side of said associated recesses are separated from the latter by humps tending to retain the dislodged coupling elements in the corresponding pockets.

7. An overload clutch as defined in claim 2 wherein said lodgements and associated recesses together constitute grooves extending generally parallel to said axis.

8. An overload clutch as defined in claim 7 wherein said grooves are centered on substantially helicoidal lines and extend in two axial directions beyond the recesses of said one of said clutch members, the last-mentioned recesses being open in both axial directions, said biasing means exerting countervailing forces upon said coupling elements for tending to keep same in line with said last-mentioned recesses.

9. An overload clutch as defined in claim 2, 7 or 8 wherein the recesses of said one of said clutch members are bounded by generally conical rollers rotatably mounted on said one of said clutch members, said coupling elements being spherical bodies, said rollers having concave generatrices with radii of curvature substantially corresponding to those of said bodies.

10. An overload clutch in claim 1, 2 or 3 wherein said clutch members are separated from each other by an annular gap, each of said coupling elements being split into two coaxial roller bodies disposed on opposite sides of said gap with freedom of relative rotation.

11. An overload clutch as defined in claim 1 wherein guide means comprises a cage centered on said axis and connected with both said clutch members by differential gear means imparting to said cage a rotary speed between the speeds of said clutch members in the decoupled condition thereof.

12. An overload clutch as defined in claim 11 wherein said cage is disposed in an annular gap between said clutch members, said differential gear means comprising a plurality of planet gears having axles rigid with said cage.

13. An overload clutch as defined in claim 12 wherein said gap is generally cylindrical, said coupling elements being spherical bodies, said biasing means comprising two concentric pressure rings with spherically concave surfaces bearing upon said bodies inside and outside said gap, respectively.

14. An overload clutch as defined in claim 13 wherein said biasing means further comprises a spring-loaded ring axially juxtaposed with said pressure rings and separated therefrom by respective antifriction bearings.

15. An overload clutch as defined in claim 1, 2, 3 or 7, further comprising a cage centered on said axis and provided with cutouts receiving said coupling elements.

16. An overload clutch as defined in claim 15 wherein said biasing means comprises at least one spring subjecting said cage to axial pressure.

17. An overload clutch as defined in claim 1, 2, 3 or 7 wherein said biasing means comprises an elastic element provided with a pneumatic damper.

* * * * *